US012647012B2

(12) United States Patent
Kotomori

(10) Patent No.: US 12,647,012 B2
(45) Date of Patent: Jun. 2, 2026

(54) SYSTEM AND METHOD OF GENERATING ELECTRICITY USING RENEWABLE ENERGY FROM ENVIRONMENT

(71) Applicant: Richard T. Kotomori, Riverside, CA (US)

(72) Inventor: Richard T. Kotomori, Riverside, CA (US)

( * ) Notice: Subject to any disclaimer, the term of this patent is extended or adjusted under 35 U.S.C. 154(b) by 612 days.

(21) Appl. No.: 18/103,402

(22) Filed: Jan. 30, 2023

(65) Prior Publication Data

US 2023/0246533 A1     Aug. 3, 2023

Related U.S. Application Data

(60) Provisional application No. 63/304,595, filed on Jan. 29, 2022.

(51) Int. Cl.
*H02K 35/02* (2006.01)
*H02K 11/00* (2016.01)
*H02K 11/04* (2016.01)

(52) U.S. Cl.
CPC ......... *H02K 35/02* (2013.01); *H02K 11/0094* (2013.01); *H02K 11/04* (2013.01)

(58) Field of Classification Search
CPC ..... H02K 35/02; H02K 11/0094; H02K 11/04
See application file for complete search history.

(56) References Cited

U.S. PATENT DOCUMENTS

| | | | | |
|---|---|---|---|---|
| 5,934,882 | A | * | 8/1999 | Olney .................... H02K 35/02 |
| | | | | 417/328 |
| 6,791,205 | B2 | | 9/2004 | Woodbridge |
| 8,604,631 | B2 | | 12/2013 | Rohrer |
| 8,810,056 | B2 | | 8/2014 | Ames |
| 9,435,317 | B2 | | 9/2016 | Cunningham et al. |
| 9,481,587 | B2 | | 11/2016 | Hughes et al. |
| 9,644,601 | B2 | | 5/2017 | Phillips |
| 2010/0117364 | A1 | | 5/2010 | Harrigan |
| 2010/0308589 | A1 | * | 12/2010 | Rohrer .................... F03B 13/24 |
| | | | | 290/53 |
| 2011/0162357 | A1 | | 7/2011 | Bellamy et al. |
| 2018/0142667 | A1 | | 5/2018 | Mallah |

FOREIGN PATENT DOCUMENTS

| | | |
|---|---|---|
| PT | 1733141 | 2/2016 |
| WO | 2012095669 | 7/2012 |

* cited by examiner

*Primary Examiner* — Shafiq Mian
(74) *Attorney, Agent, or Firm* — Innovent Law P.C.; Karima Gulick

(57) ABSTRACT

An electrical generator system comprising an environment interface and at least one generator module. The environment interface includes an interface bladder and is configured to receive a kinetic force from an environmental element to compress the interface bladder to output air from within the interface bladder. The generator module receives the outputted air from the interface bladder and includes a coil, a magnet, and a generator bladder configured to receive air and expand to move the magnet through the coil to induce a current in the coil.

19 Claims, 12 Drawing Sheets

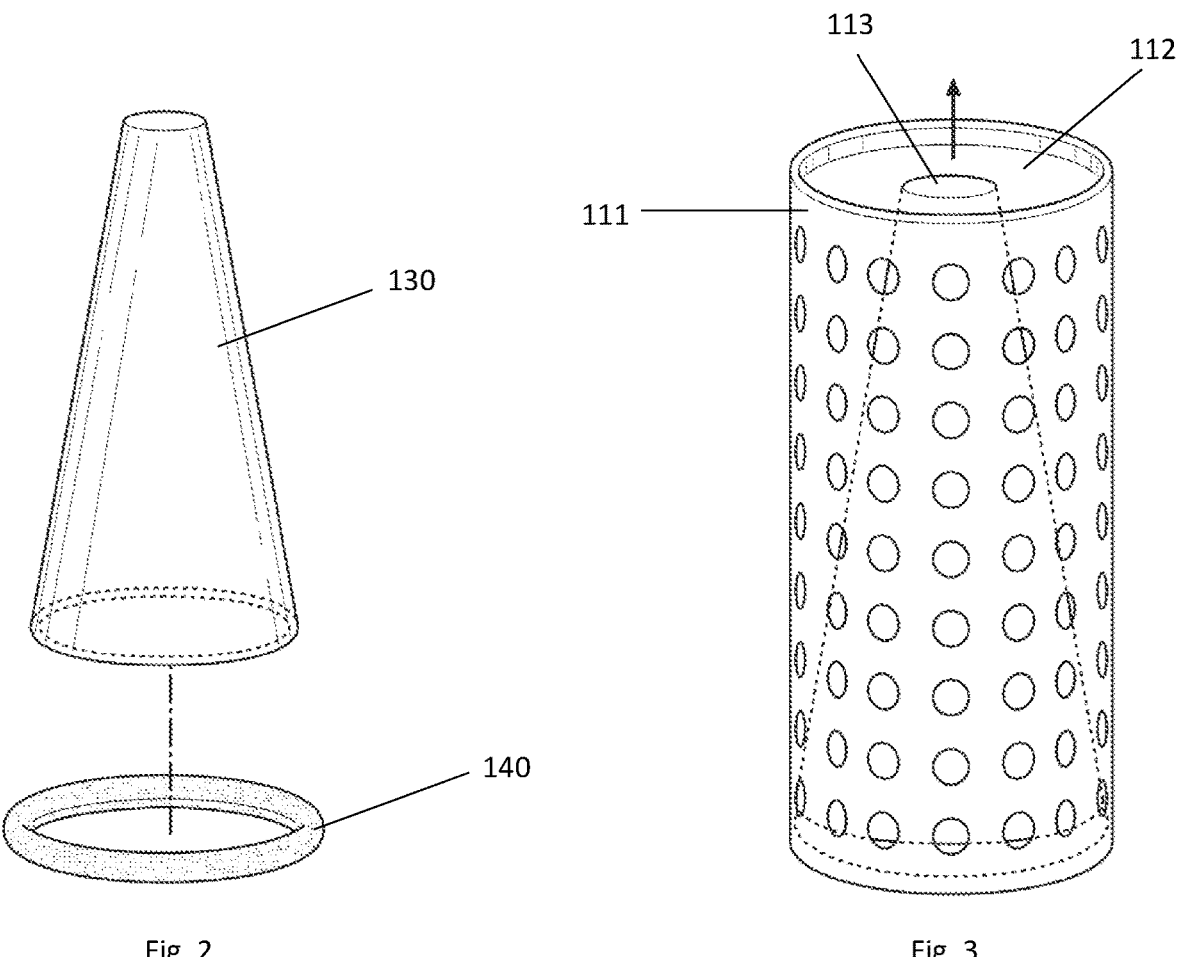
Fig. 2                        Fig. 3

100

160

160

200

300

150

SYSTEM AND METHOD OF GENERATING ELECTRICITY USING RENEWABLE ENERGY FROM ENVIRONMENT

TECHNICAL FIELD

The present disclosure relates to electricity generation system and methods. More specifically, the present disclosure relates to electrical generator system that accept kinetic forces from the surrounding environment and uses the forces to move at least one magnet through a coil to electromagnetically induce currents in the coil.

BACKGROUND

Considerable effort has been made towards devices which capture energy from renewable sources, those sources of energy which do not involve resource depletion. Renewable energy sources can reduce the impact of energy production on the environment as compared to fossil fuels, and are potentially cheaper than carbon-based sources. Sea waves and wind have been considerably developed in recent decades, while other modes of energy production are promising but lack development.

In one embodiment, the invention relates to conversion of the kinetic energy of traffic or pedestrian movement into electricity, specifically utilizing pneumatic systems and linear generators. There are several ways to convert mechanical kinetic energy from vehicles and foot traffic into electricity. Piezoelectric strategies can be used in both pedestrian pathways as well as streets. With these approaches relatively small amounts of electricity are produced by each unit. Longer stretches of piezoelectric generator arrays are required to generate substantial yields. Additionally, there is the need for them to be embedded into the road and cement itself. However, once placed they offer a smooth surface that cars can pass over at any speed. It is a potential solution but it is costly and requires some construction.

Other scenarios include pneumatic canisters in the guise of speed bumps that compress air when cars ride over them. The compressed air is stored in nearby pressurized air canisters. Google Patent search reveals that in all of the pneumatic systems identified, the air is compressed, systems are buried or embedded and high pressure air canisters store the energy. Those systems are very promising but the required extensive construction; the anticipated maintenance costs and the danger of storing pressurized gas so closely to moving vehicles make them less desirable.

A less intrusive approach with a road surface generator uses a piston system to convert air pressure into electrical energy through pistons and motors. While less costly, the system has many moving parts and mechanical energy is converted pressurized air and then it turns a pneumatic generator, losing energy with each conversion.

There is an ever increasing demand for alternative, emission free, renewable energy to supply the world's electricity demands. As transportation moves towards use of electrically driven technologies the demand for emission free power will only increase. For instance, in some parts of the world water supply is a primary need and in some cases the supply of water is from the sea and desalination of the water is required. Desalination of water requires massive amounts of electricity to provide clean water. Natural flow generated energy is a renewable energy that does not result in any carbon emissions and is a viable alternative which will reduce the need for continued use of and reliance on fossil fuels. The term natural flow will be used hereinafter to mean a renewable energy source that does not result in direct carbon emissions and examples are wind, hydro, solar and tidal energy flows.

There exist numerous wind or sea driven solutions both onshore and offshore for generating electricity but these are limited to the power output of the natural flows and also by the structural demands required to house and rotate a large capacity single generator and the wind flow drive gear. The attempt to harness the energy from waves offers some insight into other ways to convert kinetic energy into electricity. In several systems, the vertical motion that a waves impart upon floating buoys is translated into electricity through linear generators tethered to both the seafloor below and a buoy above. Mechanical kinetic energy can be converted into electrical energy through generators. Linear generators are useful when the motion is linear because there is no need for the ingenious gearing and delicate parts required to translate linear motion into rotational motion for the more common rotational generator. Thus, there is a need for an electrical generator system that is relatively portable and can generator electricity in a cost-efficient manner using natural flow.

SUMMARY

The present invention relates to an electrical generator system having an environment interface and at least one generator module. The environment interface includes an interface bladder configured to be compressed by kinetic forces from an environmental element to output air from within the interface bladder. The generator module includes a coil, magnet, and a generator bladder configured to receive air and expand to move the magnet through the coil to induce a current in the coil. The coil and magnet are preferably placed above the generator bladder, so that after the magnet passes through the coil it is then pulled vertical downward by a gravity to pass through the coil to induce another current in the coil and deflate the generator bladder. The generator module can include a rectifier configured to rectify the induced current in the coil and output DC current to charge a battery.

In another embodiment, the electrical generator system includes a conduit coupled with the environment bladder and the generator bladder. The conduit is configured to transfer air between the environment interface and the generator bladder. The interface bladder, conduit, and generator bladder collectively contain substantially constant amount of air (i.e., isobaric). The electrical generator system can also include multiple generator modules, each with its generator bladder connected to the conduit. The air from the environment bladder passes through the conduit and is preferably equally distributed to expand the generator bladder to drive the associated magnets.

The system and method of the present invention use the environment interface to receive a kinetic force from an environmental element and compress the interface bladder to output air from within the interface bladder. In one embodiment, the environment interface can be placed in a body of water such as sea/ocean in order for the waves to compress the interface bladder to output air. In another embodiment, the environment interface can be placed below or on a highway, walkway, or any suitable land surfaces, in order for the weight of a vehicle, pedestrian, or any moving object to compress the interface bladder to forcefully output air. In yet another embodiment, the environment interface can include multiple wind plates movably attached to a support, wherein a sub-bladder is placed between two adjacent wind plates. Thus, when one wind interface is moved toward an adjacent wind interface by the wind, the first wind interface will compress the sub-bladder between the two wind interface.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 2 is a perspective view of the interface bladder in one embodiment of the present invention.

FIG. 3 is a perspective view of the first case of the interface bladder in one embodiment of the present invention.

DETAILED DESCRIPTION

Figure 1:
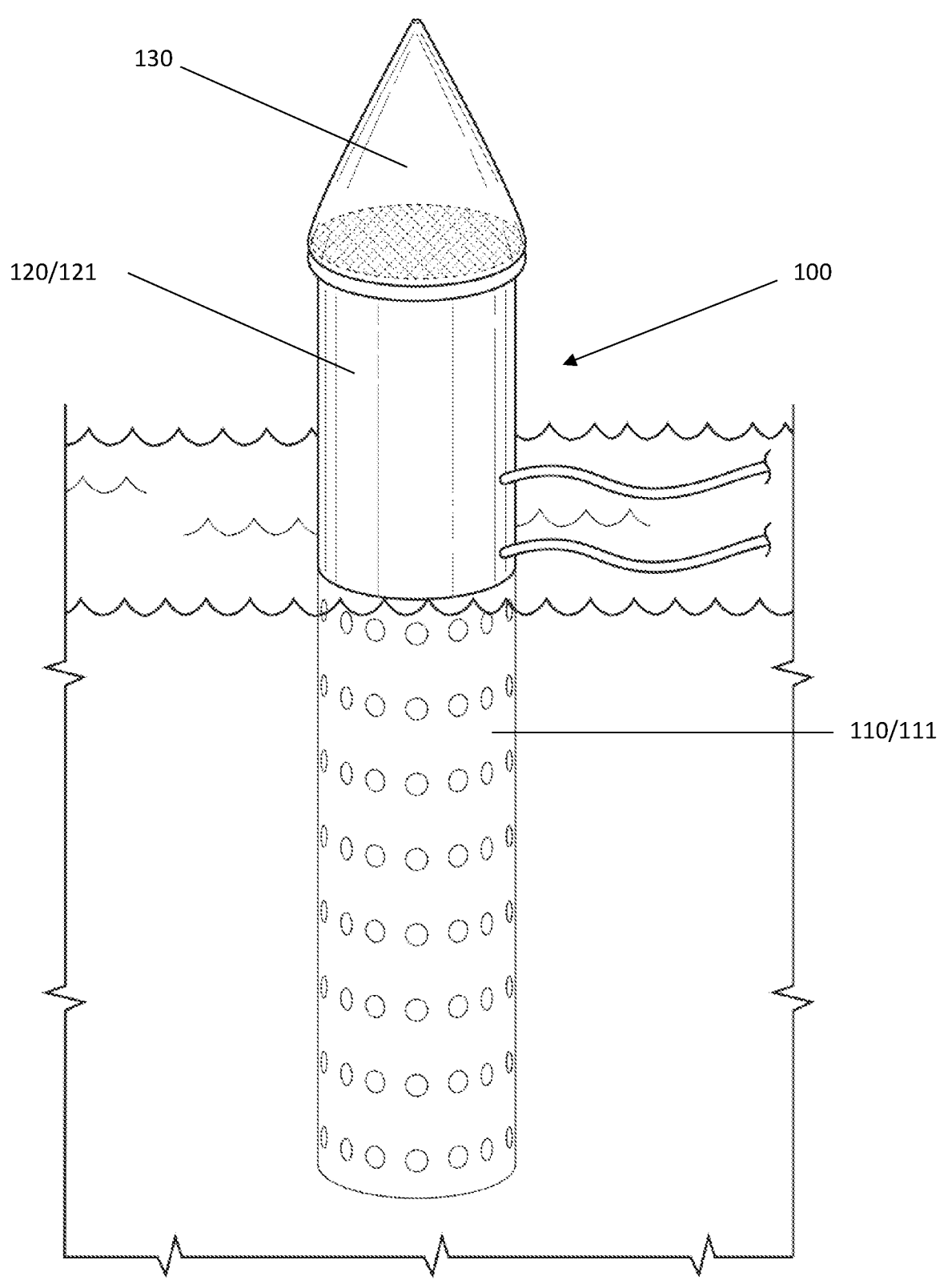
FIG. 1 is a perspective of the environment interface of the electricity generator system in one water-based embodiment of the present invention.

The embodiments can now be better understood by turning to the following detailed description of the embodiments, which are presented as illustrated examples of the embodiment defined in the claims. It is expressly understood that the embodiments as defined by the claims may be broader than the illustrated embodiments described below. Many alterations and modifications may be made by those having ordinary skill in the art without departing from the spirit and scope of the embodiments.

The present invention utilizes a linear alternator or linear generator to produce electricity by converting mechanical energy from an object's linear motion to electrical energy. A linear alternator comprises a wire coil and a permanent magnet. As the magnet passes through the coil, the change in magnetic flux induces a current in the coil. A rectifier may be used to convert the alternating current produced by the alternator to direct current. The present invention primarily concerns means of utilizing environmental conditions to drive the magnet in such a linear alternator. In at least one embodiment of the present invention, the wire coil is aligned in a primarily vertical direction, such that the magnet is raised through the coil against the force of gravity, and restored to its origin by gravity as well.

A partially inflated bladder is used as the driver of the magnet. At rest, the bladder comprises a primarily uninflated portion and a primarily inflated portion. In a preferred embodiment, The primarily uninflated portion may be positioned such that, when inflated, it expands primarily within the linear generator coil. From this point on, this primarily uninflated portion will be referred to as the generator bladder. The primarily inflated portion is positioned outside of the coil. From this point on, this primarily inflated portion will be referred to as the environment bladder.

The environment bladder should be positioned such that it may be compressed by environmental forces. The compression of the environment bladder causes the generator bladder to at least partially inflate, driving the magnet through the coil and producing electricity. As the environmental force recedes, such as the crest and trough of a wave, pressure on the environment bladder is reduced, gravity causes the magnet to fall, the generator bladder of the bladder to deflate and the environment bladder to inflate.

The electricity produced in each cycle of the magnet is ultimately determined by the rate of change of magnetic flux experienced by the coil. This is a function of several parameters, including those of the magnet and the coil windings which are fixed, and others which are variable based on variations in the environmental forces, including the velocity of the magnet and the number of windings which the magnet passes through (i.e., the height reached). Because the magnet acts against gravity, it should be understood that these latter parameters are linked, but may be optimized based on the design of the system. These factors may be influenced both by the nature of the environmental input and the specific design of the system. Volume of the environment bladder, inflation of the environment bladder, maximum length of the generator bladder, parameters of the linear alternator, and so on, all influence the proper operation and rate of energy production of the system. These concepts should be well understood by a person of ordinary skill in engineering. In particular, it should be understood that the volume of the environment bladder may be substantially larger than the generator bladder. Accordingly, a compression of the environment bladder along a given axis by 1 cm may result in displacement of the magnet by many times this distance.

During operation, the bladder should be approximately isobaric. That is, the volume of air within the system should remain constant. As the environment bladder is compressed, the generator bladder should expand such that the volume of the total inflated portion of the bladders is approximately constant. This stipulation provides that the work done by the environment on the bladders is converted mostly to kinetic energy of the magnet. Thus, the bladders should be constructed of an impermeable, low-elasticity material. Preferably, the material should also be highly durable to maximize the lifespan of the bladder. In a wave energy system, for example, the apparatus may run non-stop with a frequency on the order of 10 cycles per minute. This frequency can cause considerable wear and tear as the bladder expands and contracts, and is subjected to considerable environmental pressures. The shape of the bladder is largely determined by the environment interface. In some embodiments, the generator and environment bladders of the bladder may comprise distinct sections connected by rigid tubing. This distinction allows the bladders to expand and contract as necessary, but may ameliorate difficulties associated with complex bladder shapes required by certain environment interfaces.

In some embodiments, the linear alternator may comprise a rigid case between the coil, and the magnet and bladder within it. Such a case serves to protect the coil from damage by the magnet and bladder as the apparatus cycles. The case also serves as an exoskeleton to guide the expansion of the bladder, and a guide for the magnet. Preferably, the material of the case should be strong enough to withstand the forces exerted on it by the expansion of the bladder, but also low-friction to maximize the conversion of the magnet's kinetic energy to electricity. In particular, the material of the case should be non-ferrous and otherwise not interfere with the electromagnetic interactions between the coil and magnet. In some embodiments, the case may be constructed from PTFE (Teflon). In some embodiments, the case may be constructed from a plastic material or aluminum and coated with a low-friction material, such as PTFE or UHMW (Ultra High Molecular Weight) polyethylene.

Similarly, to potential friction between the magnet and a coil protective pipe, the magnet may experience air resistance, and it is preferable that this effect is minimized. To this end, the linear generator may be housed in a case which is vented to the atmosphere. Similarly, if the case is not vented, the expansion of the bladder could cause an increase in pressure in the case, and thus prevent the generator bladder from reaching its maximum potential height.

In some embodiments the device may comprise multiple linear generators for a given environment bladder. A single environment bladder portion may in turn branch off to form multiple generator bladders that may drive magnets in each of the arrays. This may allow more electricity to be generated for a given system. In different embodiments, multiple environment bladders can be used at the same time to output air for expanding the generator bladders and move the magnets each associated with a generator bladder.

A major challenge in practicing the present invention is ensuring the generator bladder deflates in a manner which allows it to inflate on the next cycle. Just as a parachute may not open properly if it becomes tangled, the bladder may not properly inflate if it does not deflate properly. To this end, the generator bladder may be shaped such that it deflates more reliably. In one embodiment, this portion is cone shaped. The bladder or tube, or both, may comprise structures which further enhance the bladder's ability to deflate neatly.

In one embodiment, the system is used to capture energy from waves. The system may comprise a submerged section and an above-water section. The submerged section may be secured to a stable structure, such as a pier, which is at least largely vertically stable in terms of tides. The submerged section comprises the environment bladder. The submerged section may comprise a housing to enclose and protect the environment bladder. The housing may be fenestrated or perforated to negate the buoyancy of the housing. As waves pass over the submerged portion, the pressure exerted on the submerged environment bladder increases and decreases, in turn driving the magnet. The environment bladder may be weighted to at least partially negate its buoyancy.

The above-water section comprises the linear alternator and generator bladder, as well as a protective outer pipe. As the above-water section houses electrical components including the linear alternator coil, the protective outer case should be water-impermeable. Because it is advantageous in terms of efficiency that the case be vented, additional structures may be employed to provide venting without allowing the ingress of sea water. The case may comprise a domed cap. Air heaters may be deposed on such venting on the case to dry the humid sea air.

The bladders may be connected by flexible or rigid tubing, and the tubing may connect to the bladder portions via an air-tight seal. The sealing may include a band clamp, adhesives, threading, or any other sufficient means of achieving an air-tight connection. Preferably, the generator bladder is inflated such that the magnet never falls below the level of the coil, in order to ensure that each cycle of the system harvests as much energy as possible. Similarly, the coil should be tall enough that the magnet does not exceed the height of the coil at its peak. High and low tides will affect the position of the magnet at rest, and attention should be paid to accommodate these extremes.

In another embodiment, the system may be practiced in a road- or walkway-based environment interface. In this embodiment, the environment bladder is positioned on the surface of a road or walkway. As a vehicle or pedestrian passes over the bladder, the weight causes the environment bladder to slightly compress and output air to expand the generator bladder and driving the magnet. In such applications, stability of the vehicle or pedestrian is important, so the environment bladder should be designed and pressurized such that the deformation does not cause instability.

In another embodiment, the system may be practiced in a wind-based environment interface. In this embodiment, the environment bladder mounted to a rigid structure or support. As gusts of wind hit the face of the bladder, the bladder compresses and drives the magnet. In some embodiments, the system may comprise a large wing- or sail-like structure in contact with the environment bladder, serving to increase the force of the wind exerted on the bladder.

FIG. 1 illustrates an environment interface 100 configured to receive kinetic force from the surrounding environment and use the kinetic force to move a magnet through a coil to induce current in said coil. In the present embodiment, the environment interface 100 is placed in a body of water such as sea to captures kinetic energy from waves. The environment interface 100 includes a submerged section 110, an above-water section 120, and an interface bladder 130. As illustrates in FIG. 1, the submerged section 110 includes a first case 111 having a plurality of apertures configured for waves of water to flow in and out of the first case 111. On the other hand, the above-water section 120 includes a second case 121 coupled with the first case 111. The interface bladder 130 is almost entirely contained in the combination of the first and second cases 111, 121. Only an end portion of the interface bladder 130 is configured to protrude from one end of the second case 121.

In the present embodiment, the interface bladder 130 is configured to contain air and has properties similar to balloons. However, the interface bladder 130 is preferably flexible and able to expand and compress based on the forces exerted on the interface bladder 130. Also, the interface bladder 130 is substantially isobaric, i.e., the volume of air within the interface bladder 130 preferably remains constant. Thus, the interface bladder 130 should preferably be constructed of an impermeable, low-elasticity material. Preferably, the material for the interface bladder 130 should also be highly durable to maximize the lifespan of the interface bladder 130.

When wave peaks reach the submerged section 110, the water flows into the first case 111 through the apertures and compresses the lower portion of the interface bladder 130 within the first case 111. At this time, the air within interface bladder 130 is pushed upward so that the end portion of the interface bladder 130 protrudes from one end of the second case 121. In the present embodiment, the end portion filled with air has a cone shape, wherein the tip of the end portion is configured to push a magnet through a coil to electromagnetically induce currents in the coil.

FIGS. 2-3 illustrates an alternative embodiment of the interface bladder 130 and FIG. 3 is a transparent view of an alternative embodiment of the first case 111. As illustrates in FIG. 3, the first case 111 includes a plurality of apertures for sea water to pass through. However, in different embodiments, the first case 111 may include only one or a few apertures bigger in sizes than the ones illustrated in FIG. 3. In FIG. 2, the environment interface 130 further includes a weight 140 configured to be attached to the bottom portion of the interface bladder 130 and coupled with the bottom of the first case 111. In FIG. 3, the first case 111 includes an interior space for accommodating the interface bladder 130 and the weight 140. Further, the first case 111 includes a top cover 112 and a first aperture 113 formed at the center of the top cover 112. When the sea water enters the first case 111 and compresses the interface bladder 130, the air within the interface bladder 130 will be moved upward and eventually exit the first case 111 through the first aperture 113.

Figure 4:
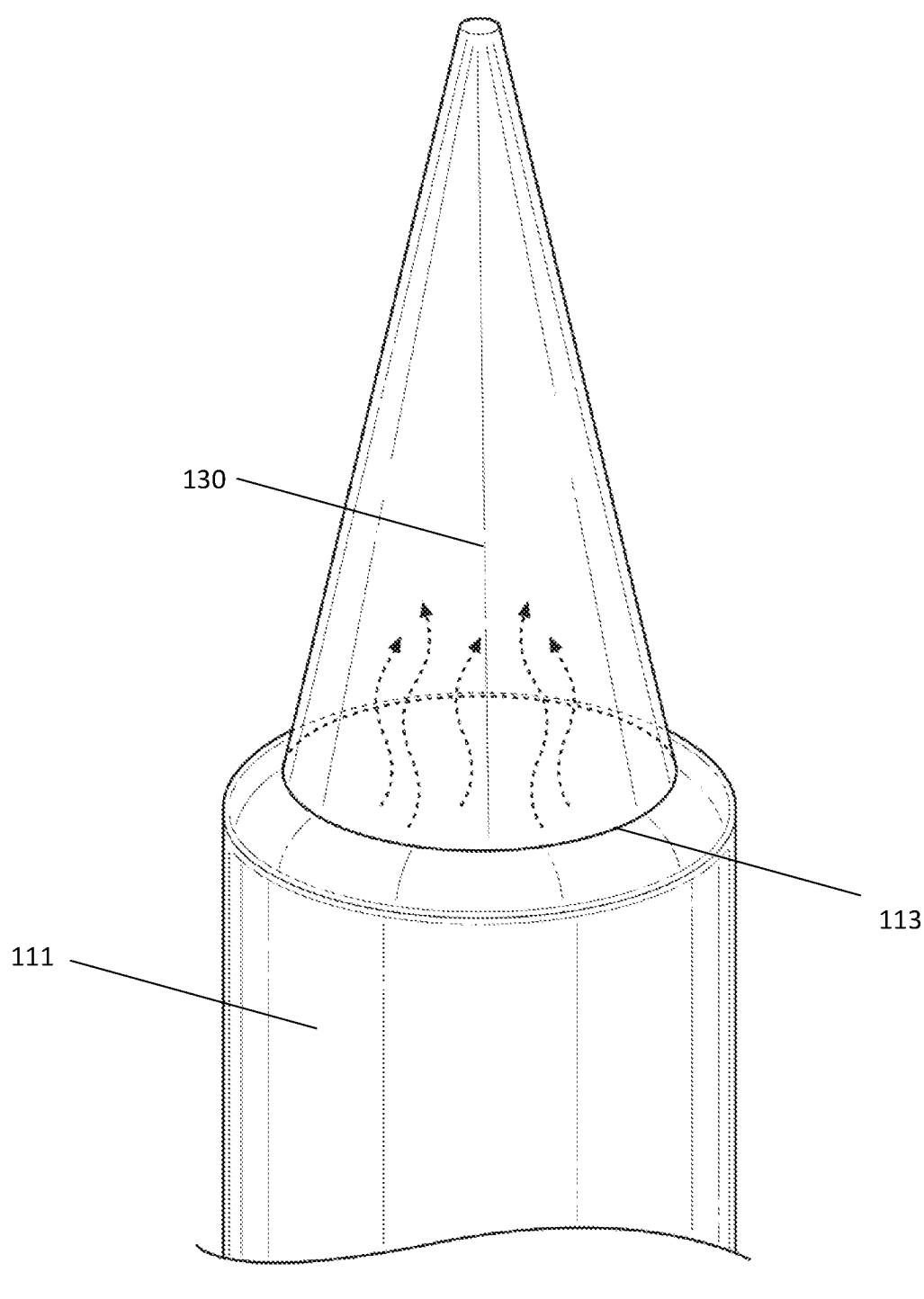
FIG. 4 is a perspective view of the environment interface in an alternative embodiment of the present invention.

FIG. 4 illustrates an alternative embodiment of the environment interface 130 of the present invention. In the present embodiment, the first case 111 includes a first aperture 113 but does not include a cover to adjust the area of the first aperture 113. Thus, when sea water enters the first case 111 and compresses the interface bladder 130, the air within the interface bladder 130 will be moved upward. The portion of the interface bladder 130 closest to the first aperture 113 will expand and pass through the first aperture 113 to move the magnet (not illustrated in FIG. 4) right above the first aperture 113.

Figure 5:
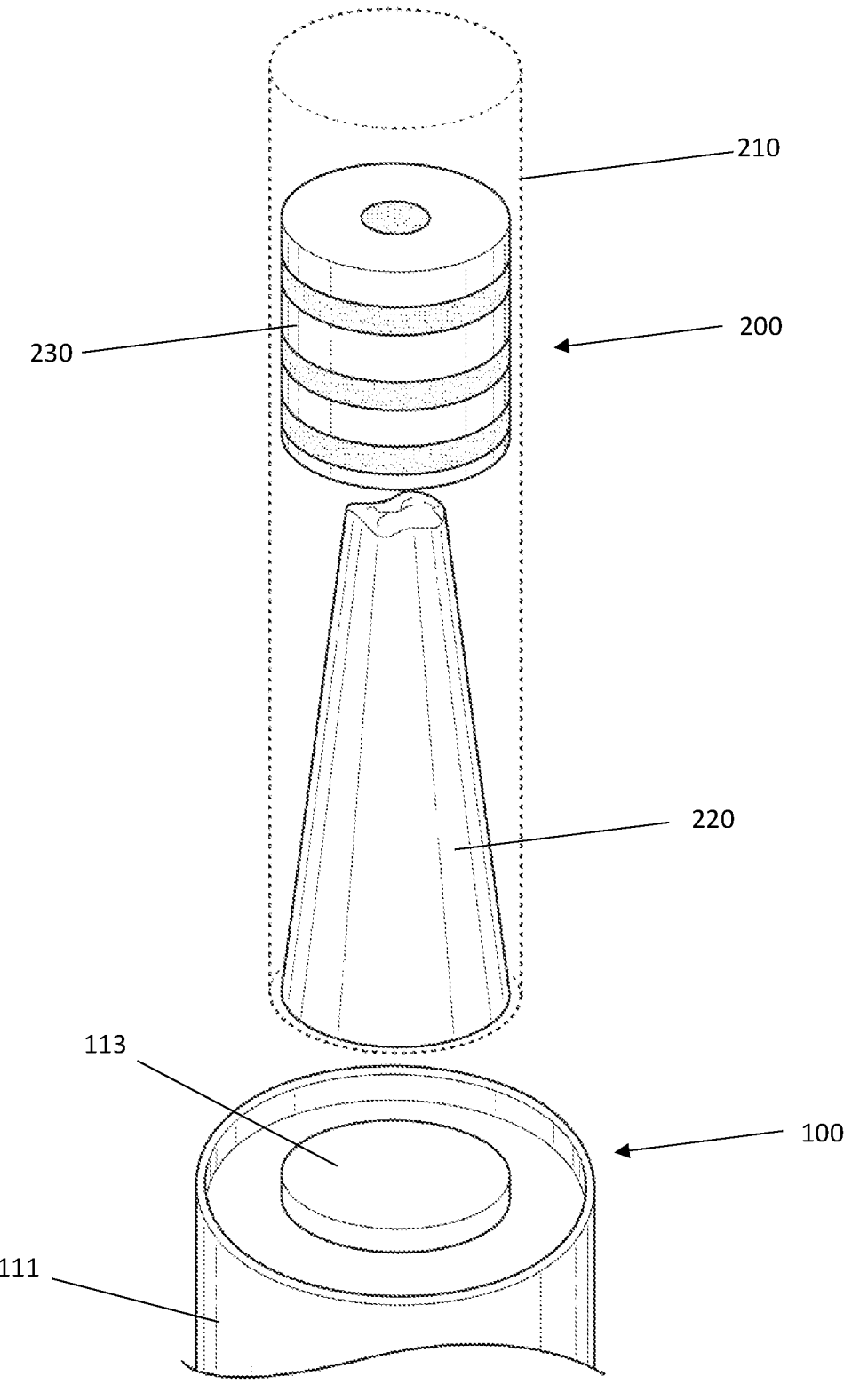
FIG. 5 is a perspective view of the generator module above an environmental in one embodiment of the present invention.

FIG. 5 is an embodiment of the electrical generator system having an environment interface 100 and a generator module 200. The generator module 200 includes a second case 210 (illustrated in a dotted line), a generator bladder 220, and a magnet 230. In the present embodiment, the generator bladder 220 is configured to receive air from the first case 111 of the environment interface and expand to push the magnet 230 upward. The second case 210 of the present embodiment is a cylindrical case having at least one opening at one end. The area of the end of the second case 210 is substantially equal to that of the first aperture 113 of the first case 111. In FIG. 5, the second case 210 is positioned upright and placed directly above the first aperture 113, so that air outputted from the first aperture 113 can enter the second case 210 through its opening.

In the present embodiment, the generator bladder 220 of the present embodiment is cone-shaped and has a narrow top portion and a broad bottom portion. The bottom portion of the generator bladder 220 is open and configured to cover the first aperture 113 to completely receive air pushed from the interface bladder 130. During operation, when wave peaks reach the submerged section 110, the sea water flows into the first case 111 through the apertures (illustrated in FIG. 3) and compresses the lower portion of the interface bladder 130 within the first case 111. The air within interface bladder 130 is pushed upward and enters the generator bladder 220 through the first aperture 113. The generator bladder 220 expands in response to the moving air from below, wherein the top portion of the generator bladder 220 will move upward and move the magnet 230 upward. As will be described below, the magnet 230 moving upward will approach and pass through at least one coil to electromagnetically induce current in said coil.

Figure 6:
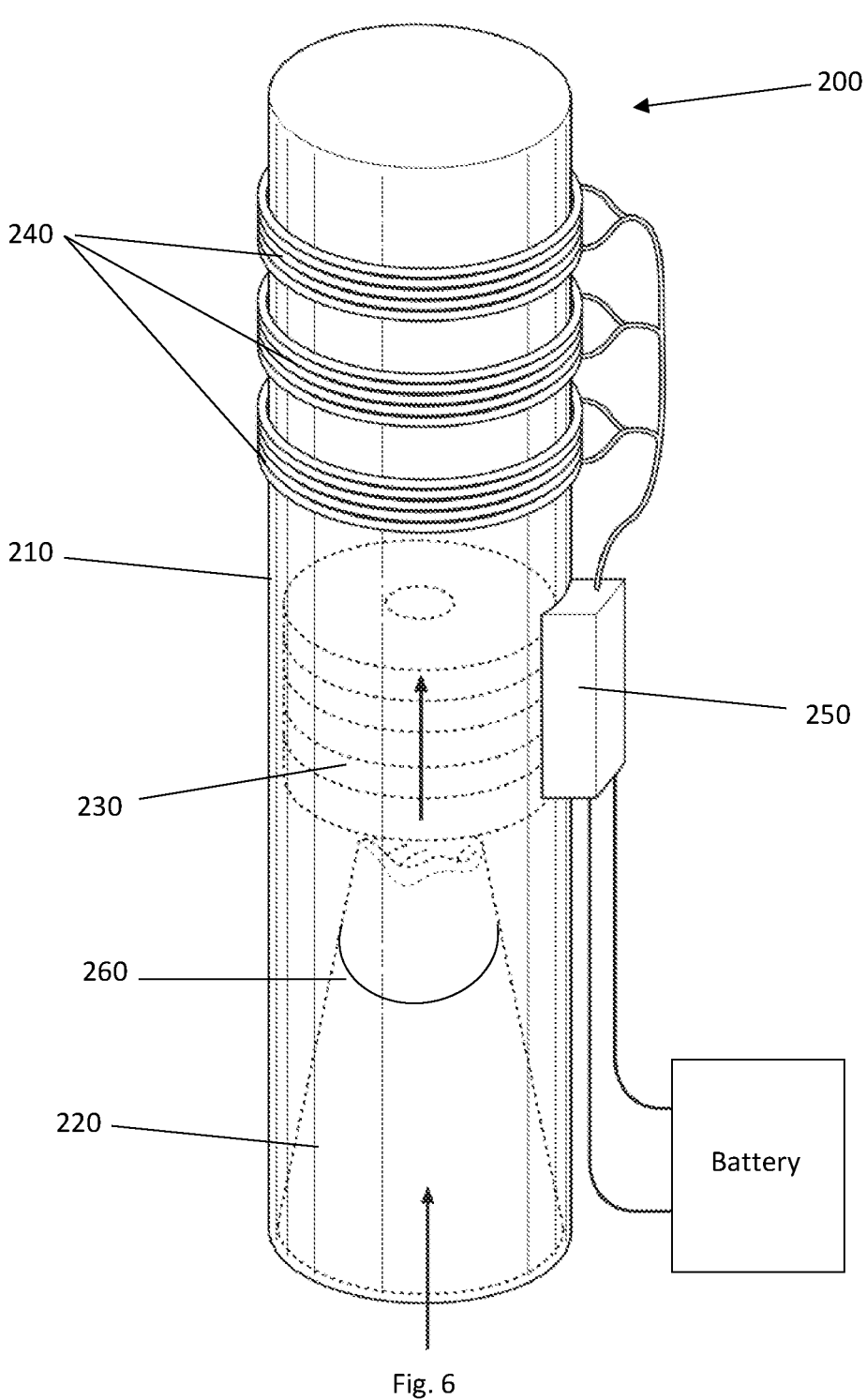
FIG. 6 is another perspective view of the generator module further including coils and a rectifier.

FIG. 6 is a perspective view of the generator module 200 in one embodiment of the present invention. The generator module 200 further includes a plurality of coils 240 configured to surround the second case 210. When the magnet 230 is moved upward by the generator bladder 220 as described above, the magnet 230 will pass through the coils 240. When a magnet 230 moves in relation to an electromagnetic coil 240, this changes the magnetic flux passing through the coils 240, and thus induces the flow of an electric current, which can be used to do work. As illustrated in FIG. 6, the generator module 200 further includes a rectifier 250 connected to both the coils 240 and a battery. Further, when the magnet 230 is pulled downward by the gravity the magnet 230 will pass through the coils 240 again to electromagnetically induce another current in the coils 240. However, the polarity of the current induced by the magnet 230 moving downward will be opposite to that of the current induced when the magnet 230 moving upward. The result is that the current induced in the coils 240 is overall an alternating current. The rectifier 250 is thus configured to the covert the alternating current from the coils 240 to direct current, i.e., current flowing consistent in one direction to charge the battery. In the present embodiment, the rectifier 250 is a full-wave rectifier configured to convert the currents induced in the coils to pulsating direct current, and yield a higher average output current. However, in different embodiments, the rectifier 250 can be single-phase rectifier (such as half-wave rectifier), three-phase rectifiers or other electrical circuits suitable for converting AC to DC. Further, in the present embodiment, the rectifier 250 can additionally include a filter for filtering high-order harmonic signals present in the output of the coils 240.

Further, as the magnet 230 is pulled downward by the gravity, the magnet 230 also compresses the generator bladder 220 which in turn outputs air through the first aperture 113 (illustrated in FIG. 5) and back to the interface bladder 130 within the first case 111. The decompression of the generator bladder 220 is preferably facilitated by both gravity and wave troughs of the sea which removes the kinetic energy that expanded the interface bladder 130 in the first place. The decompression of the generator bladder 220 also in a way recharges the interface bladder 130 with air for the next wave peak to enter the first case 111 and compress the interface bladder 130 to send air toward the generator bladder 220 again.

Further, to facilitate the compression of the generator bladder 220 by the magnet 230 pulled by the gravity, the generator module 200 includes at least one cord 260 placed on or attached to the generator bladder 220. The cord 260 preferably has only slightly greater circumference than that of the cross-section of the generator bladder 220 encircled by the cord 260. The cord 260 aims to make sure that the air in the generator bladder 220 can only be moved in one direction, i.e., downward, so that all the air can be quickly transferred back to the interface bladder 130. The cord 260 also helps, during the expansion of the generator bladder 220, by ensuring that air flows only in one direction, i.e., upward. The cord 260 can also be used to limit the extent that the generator bladder 220 can expand and so protects the generator bladder 220 from damage by over-expansion.

In the embodiment illustrated in FIG. 6, the generator module 200 makes use of only one cord 260. However, in different embodiments, the generator module 200 can include two or more cords 260, each having different circumference and disposed on different part of the generator bladder 220. Also, the environment interface 100 can also include one or more cords 260 encircling the interface bladder 130 to facilitate the compression and expansion of the interface bladder 130.

Figure 7:
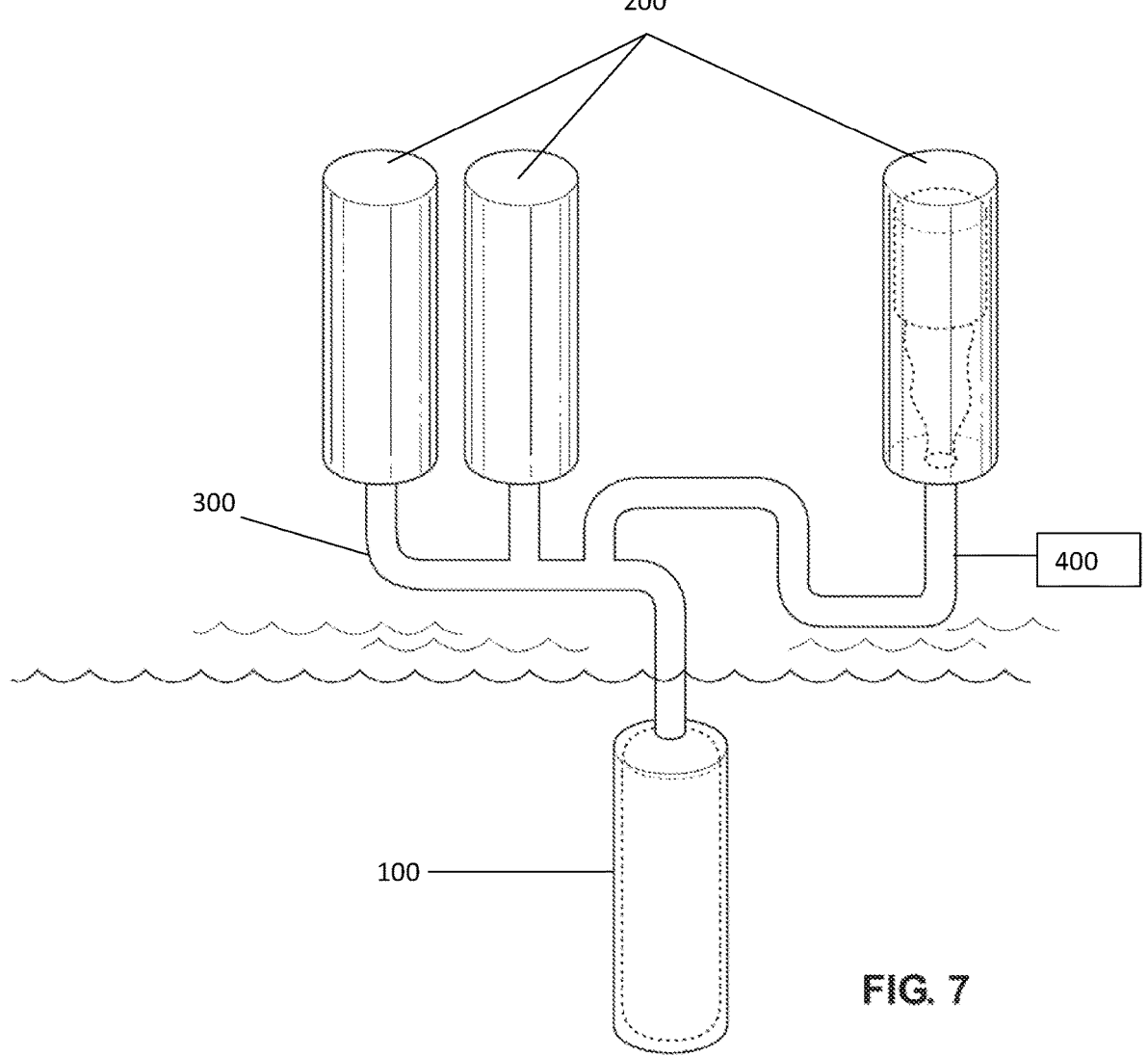
FIG. 7 is a perspective view of the electrical generator system according to an alternative water-based embodiment of the present invention.

In the embodiments described above, the electrical generator includes only one generator module 200 located directly above the environment interface 100. In different embodiments, the electrical generator can include a plurality of generator modules 200 and a conduit between the environment interface and the generator modules. FIG. 7 illustrates an alternative embodiment of the electrical generator that includes an environment interface 100, a plurality of generator modules 200, and a conduit 300. In the present embodiment, the conduit 300 is connected to both the interface bladder 130 of the environment interface 100 and the generator bladder 220 of the generator module 200. The conduit 300 is configured to be a passage for air flow between the bladders 130, 220. When wave peaks reach the submerged section 110, the sea water flows into the first case 111 through the apertures and compresses the interface bladder 130 within the first case 111. The air within interface bladder 130 is pushed upward, enters the conduit 300, and move toward the generator bladders 220 of the generator modules 200. In the present embodiment, the length of the section of conduit 300 between the interface bladder 130 and each generator bladder 220 is preferably substantially equal, to ensure that the air from the interface bladder 130 can be distributed equally amongst the generator bladders 220. However, in different embodiments, the length of the section of conduit 300 between the interface bladder 130 and each generator bladder 220 can be made different from one another, depending on various factors such as the weight of the magnet 230, length of the second case 210, number of coils 240, etc.

Further, the system of interface bladder 130, generator bladders 220, and conduit 300 should be approximately isobaric. That is, the volume of air within the system should remain constant. As the interface bladder 130 is compressed, the generator bladders 220 should expand such that the volume of the total inflated portion of the bladders 130, 220 is approximately constant. To make sure that there is no air leakage, the bladders 130, 220 and conduit 300 should be constructed of an impermeable, low-elasticity material. The electrical generator system further includes a regulator module 400 having an air pressure regulator and air compressor to regulate the air pressure in the system of bladders 130, 220 and conduit 300. The regulator module 400 is preferably powered by the current from the rectifier 250 and can be modified to be powered by other power supply readily available. Also, in different embodiments, more than one environment interface 100 can be deployed in the sea, wherein two or more interface bladders 130 can be compressed by the waves to output air to expand the existing or more generator bladders 220 and move the magnets to electromagnetically induce current in the coils.

Figure 8:
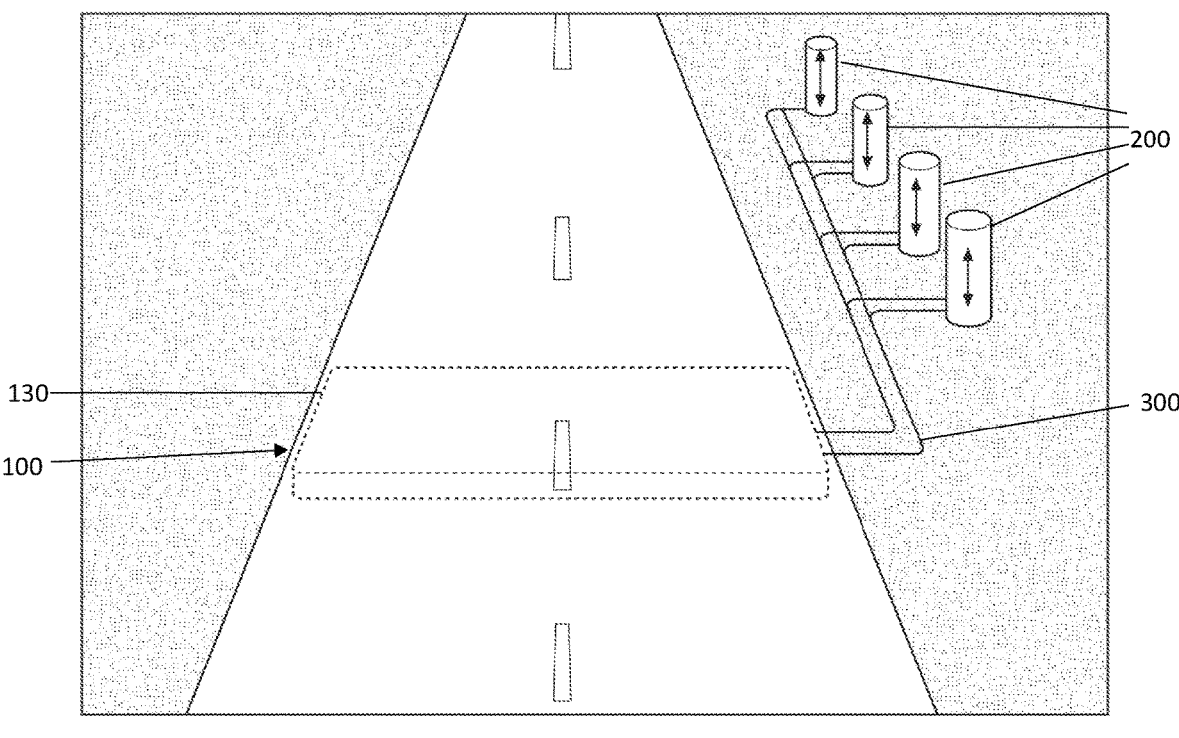
FIG. 8 is a perspective view of the electrical generator system according to an alternative land-based embodiment of the present invention.

FIG. 8 illustrates an alternative embodiment of the electrical generator system of the present invention. Here, the electrical generator system is configured to transform kinetic energy from the environment bladder 130 to the interface bladders 220 which then outputs the air within the drive the magnet 230. More specifically, the electrical generator system aims to convert kinetic energy from a moving object such as a vehicle or pedestrian to kinetic energy of the magnet 230. As illustrated in FIG. 8, the electrical generator system includes an environment interface 100, a plurality of generator modules 200, and a conduit 300. The generator modules 200 in FIG. 8 are substantially the same as the one described above. The conduit 300 is also substantially the same as the one described above and is configured to be a passage of air transfer between the environment interface 100 and the generator modules 200. In the present embodiment, the environment interface 100 includes an interface bladder 120 placed below a highway. As a vehicle passes over the interface bladder 130, the weight causes the interface bladder 130 to compress and transfer air from within the interface bladder 130, through the conduit 300, and finally enter and expand the generator bladders 220 to drive the magnet 230. In such applications, stability of the vehicle or pedestrian is important, so the bladders 130, 220 should be designed and pressurized such that the deformation does not cause instability. Thus, the interface bladder 130 is preferably uniformly distributed over the width of the highway. Further, in other embodiments, the interface bladder 130 can be placed on or below on any land where regular movement of various objects can be expected. Thus, the interface bladder 130 can be placed on or below a pedestrian walkway or a plane runway so that the weight of the object causes the interface bladder 130 to compress and output air to eventually expand the generator bladders 220 and drive the magnet 230.

Figure 9:
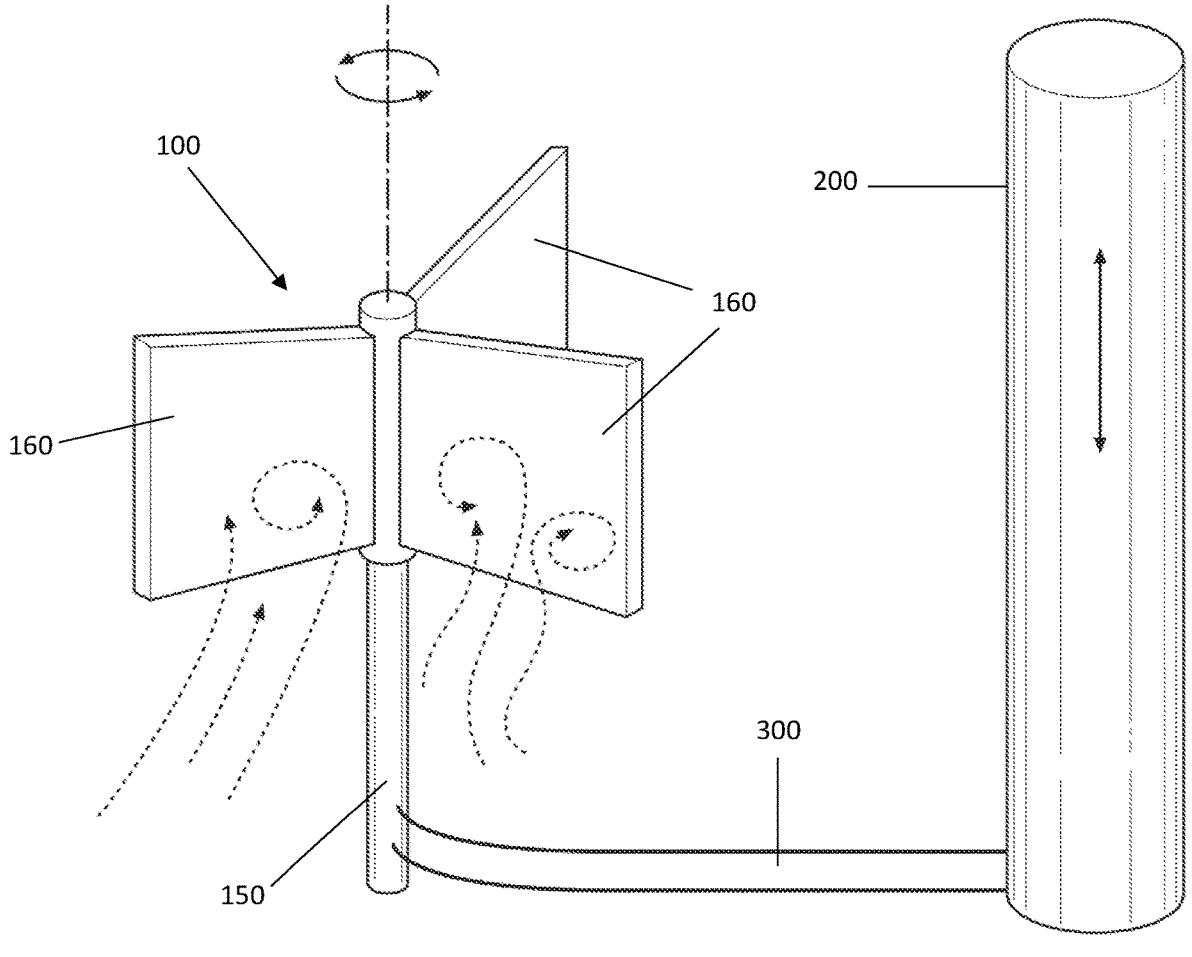
FIG. 9 is a perspective view of the electrical generator system according to an alternative wind-based embodiment of the present invention.

FIG. 9 illustrates yet another alternative embodiment of the electrical generator system of the present invention. The electrical generator system includes an environment interface 100, a generator module 200, and a conduit 300. The environment interface 100 includes a support 150 and a plurality of wind interfaces 160 movably attached to the support 150. In the present embodiment, the wind interfaces 160 are carbon fiber boards or plate with one end movably attached to the support 150, so that the wind interfaces 160 can be moved by the wind toward the direction of the wind. In the present embodiment, the environment interface 100 preferably includes at least three sub-bladders 170 (illustrated in FIG. 10), each placed between two adjacent wind interfaces 160.

Figure 10:
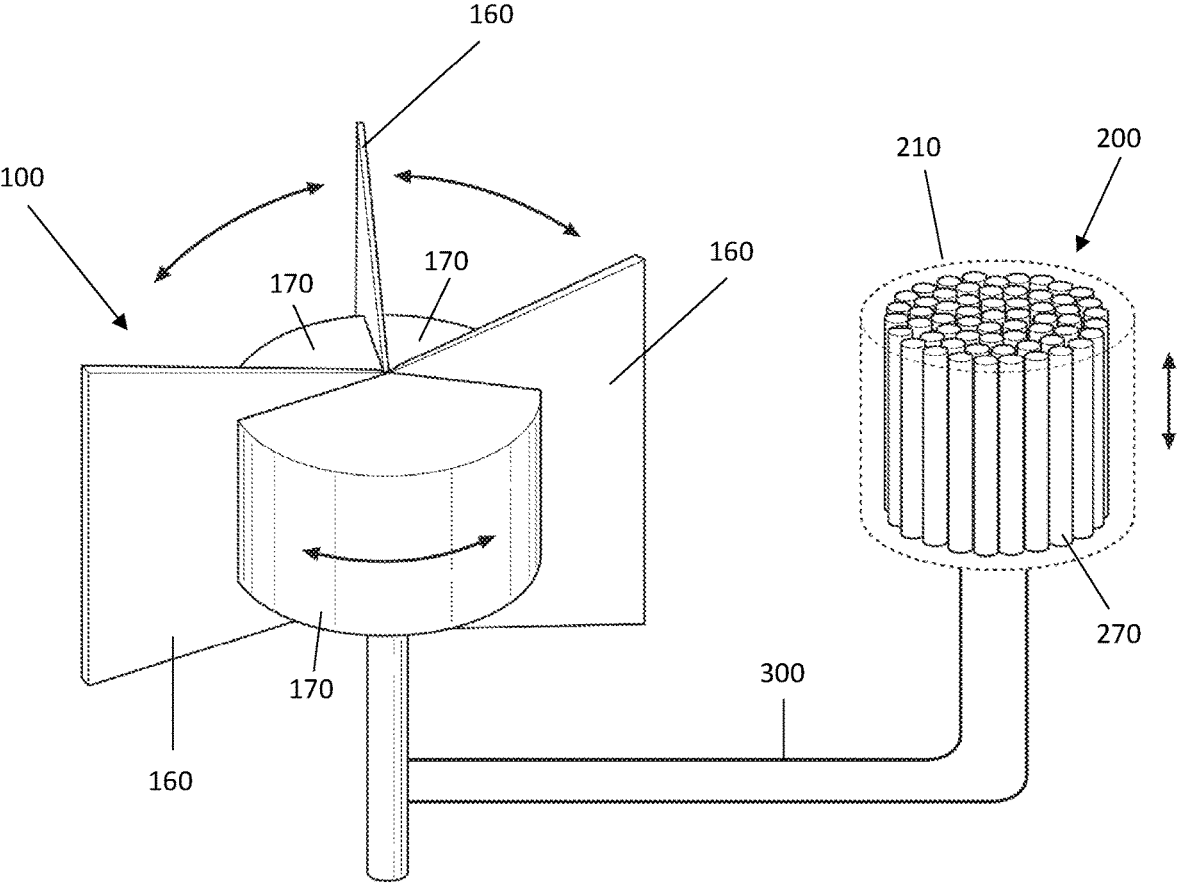
FIG. 10 is a perspective view of the electrical generator system according to another wind-based embodiment of the present invention.

Here please refer to FIGS. 6, 9, and 10 for the following description. When one wind interface 160 is moved toward an adjacent wind interface 160 by the wind, the first wind interface 160 will compress the sub-bladder 170 between the two wind interface 160. The air within the compressed sub-bladder 170 will travel through the conduit 300 toward the generator module 200, expand the generator bladder 220, and drive the magnet 230 toward the coils 240. In the embodiment illustrated in FIG. 9, when wind flow in a direction into the page of FIG. 9, two of the three wind interfaces 160 will be moved in the direction into the page and toward the third wind interface 160. As the two wind interfaces 160 move toward the third wind interface 160, they will compress the sub-bladders 170 between them and the third wind interface 160 to send out air within the two sub-bladders 170 and toward the conduit 300.

FIG. 10 illustrates an alternative embodiment to the electrical generator in FIG. 9. As illustrated, the electrical generator also includes an environment interface 100, a generator module 200, and a conduit 300. The environment interface 100 and conduit 300 are substantially identical to the counterparts in the embodiment illustrated in FIG. 9 and thus will not be described here. However, in the present embodiment, the generator module 200 includes a plurality of minor generator modules 270, each having substantially the same structure as the generator module illustrated in FIG. 6.

Figure 11:
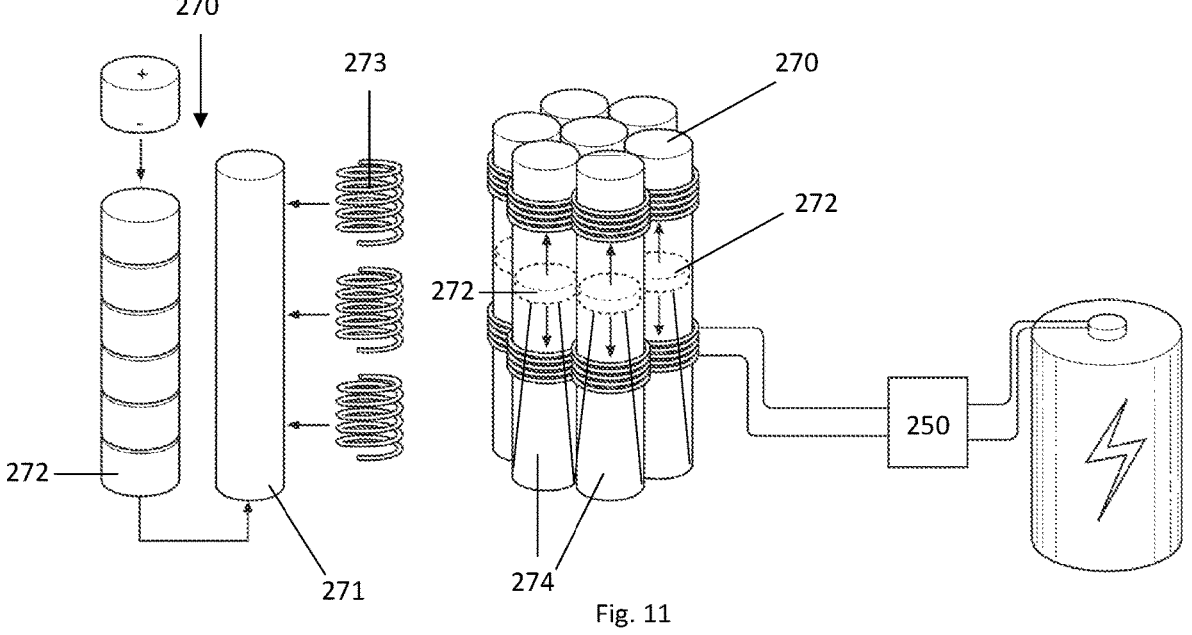
FIG. 11 is a perspective view of a bundle of generator modules illustrated in FIG. 10.

FIG. 11 illustrates the minor generator modules 270 illustrated in FIG. 10. Each of the minor generator modules 270 includes a minor case 271, one or more minor magnets 272 placed within the minor case 271, at least one or more coils 273 surrounding the minor case 271, and a rectifier 250 for receiving and rectifying the current induced at the coils. Also, the minor generator module 270 are bundled together and contained in the second case 210 of the generator module. Each minor generator 270 also includes a minor bladder 274 connected to the conduit 300 (illustrated in FIG. 10) and configured to receive the air from the conduit 300 (from the bladder of the environment interface) and expand to drive the minor magnet 272 upward. The use of multiple minor generator modules 270 allows the manufacturer to customize the overall size of the generator module 200 by alternating the number of minor generator modules 270 included in each generator module 200. In this way, the manufacturer can make different types of generator modules 200 based on considerations such as the desired overall current output, weight, size limitation, etc. The use of minor generator modules 270 also makes the electrical generator system of the present invention more portable. Instead of moving one big generator module having a much heavier magnet, the user can decide how many lighter minor generator modules 270 to be incorporated in the generator module.

Figure 12:
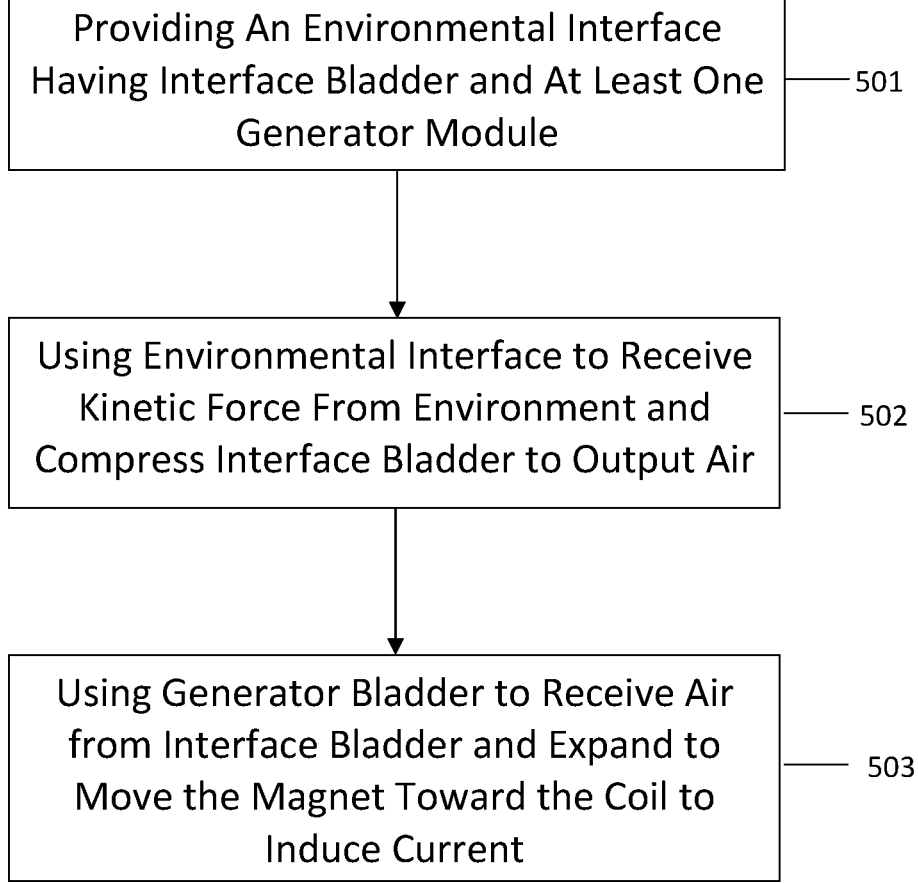
FIG. 12 is a flow chart of the method of generating electricity according to one embodiment of the present invention.

FIG. 12 is a flow chart illustrating a method to generate electricity using kinetic energy from renewable environmental resources. Step 501 involves providing an environment interface having an interface bladder and at least one generator module having a coil, a magnet, and a generator bladder. The structures and functions of the environment interface and the generator module are substantially identical to those of the counterparts described above and thus will not be repeated here. Step 502 involves using the environment interface to receive a kinetic force from an environmental element and compress the interface bladder to output air from within the interface bladder. In one embodiment, the environment interface can be placed in a body of water such as sea/ocean in order for the waves to compress the interface bladder to output air. In another embodiment, the environment interface can be placed below or on a highway, walkway, or suitable land surface, in order for the weight of a vehicle or pedestrian to compress the interface bladder to forcefully output air. In yet another embodiment, the environment interface can include multiple wind plates movably attached to a support, wherein a sub-bladder is placed between two adjacent wind plates. Thus, when one wind interface is moved toward an adjacent wind interface by the wind, the first wind interface will compress the sub-bladder between the two wind interface. Step 503 involves using the generator bladder to receive the outputted air from the interface bladder and expand to move the magnet toward the coil to induce a current in the coil. The air from the interface bladder enters the generator bladder through a conduit. The generator bladder then expands and move the magnet toward the coils to electromagnetically induce current at the coils.

In one embodiment of the method, the generator module is placed directly above the generator bladder. Thus, after the magnet passes through the coil it is then pulled vertical downward by a gravity to pass through the coil to induce another current in the coil and deflate the bladder. At the same time, the magnet pulling by the gravity compresses the generator bladder to transfer air therein back to the interface bladder. Once the interface bladder is substantially filled with air from the generator bladder, it is ready to be compressed by either waves or other environmental element to output air again to the generate bladder.

Figure 13:
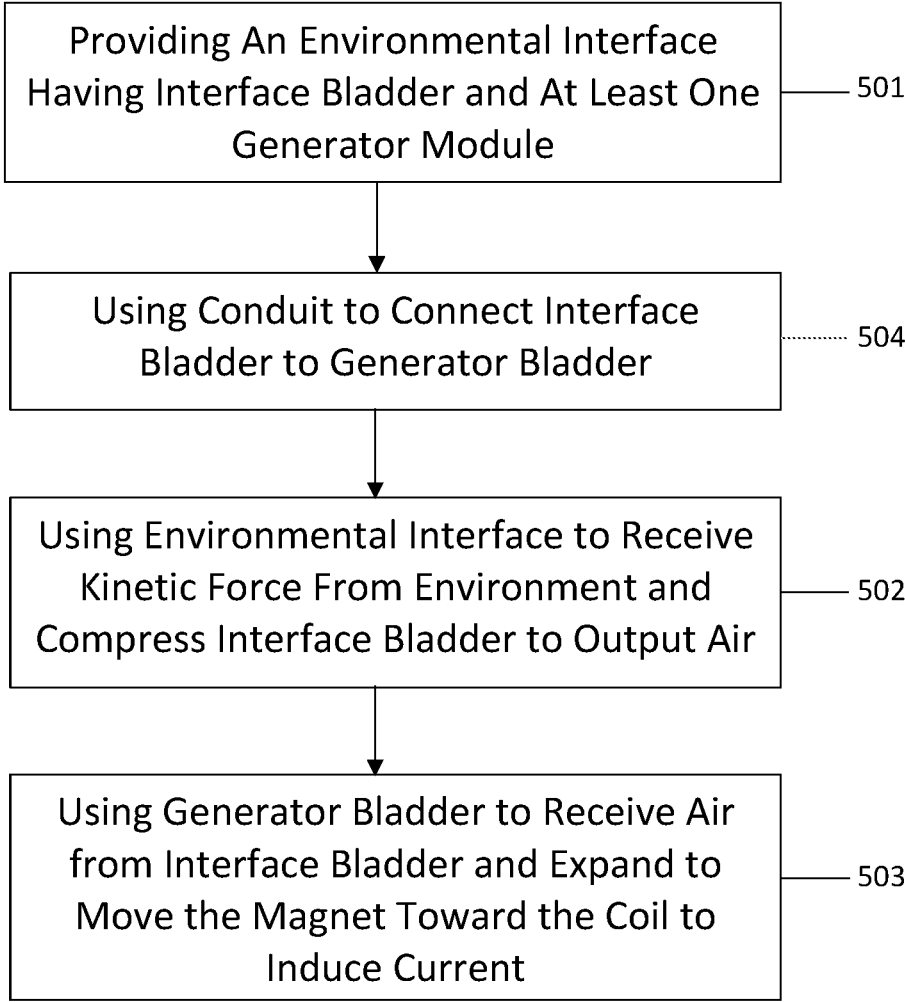
FIG. 13 is a flow chart of the method of generating electricity in an alternative embodiment of the present invention.

FIG. 13 is a flow chart illustrating an alternative embodiment of the method of FIG. 12. The method further includes step 504 of using a conduit to connect the interface bladder to the generator bladder. The step involves connecting one end of a conduit to the interface bladder to receive the outputted air and connecting another end of the conduit to the generator bladder, to transfer air between the interface bladder and the generator bladder. Thus, the conduit is configured to be a passage for air flow between the bladders.

When wave peaks reach the submerged section, the sea water flows into the first case through the apertures and compresses the lower portion of the interface bladder within the first case. At this time, the air within interface bladder is pushed into the conduit and moves toward the generator bladders of the generator module. In one embodiment, the method employs only one generator module connected to the environment interface via the conduit. However, in different embodiments, multiple generator modules can be used instead of a single one. Thus, step 504 also includes using the conduit to connect the interface bladder with a plurality of generator bladders to transfer air between the bladders. In yet another embodiment, step 504 can also include using the conduit to connect multiple interface bladders below sea level with multiple generator bladders above sea level.

The Electricity Generator System of the present invention is a novel approach in the field of conversion of mechanical kinetic energy into electricity. A brief description for comparison helps highlight its distinguishing features. In this closed system, cost, scalability, ease of deployment and amount of energy generated are guide posts that inspired the design. In one embodiment, a simple airbag in the general shape of the letter "L" is partially inflated and at the 90 degree angle of the airbag a vertically mounted, rigid tube serves as the exoskeleton for the encased soft and collapsible airbag. Within the vertical casing, a heavily weighted magnet sits atop a compressed section of the airbag exerting downward force onto the airbag thereby ensuring pressurized air throughout the rest of the airbag system. Imagine it as a pneumatic see-saw or fulcrum-less lever in which any force applied to one side nearly simultaneously translates to the other side. In this instance the inflated section lies across the road. When compressed, the magnet side rises within the vertical tube. The L-shaped airbag thus becomes the means of moving the permanent magnet of the linear generator. Windings of copper surround the exterior casing so that moving magnetic field passes vertically through the wires and induces electrical current to flow.

Unlike the speed bump pneumatic systems described above, there is no digging into asphalt for the interment of expensive, weight triggered, air compressing units. There are no hoses to pressurized air canisters which are not only potentially dangerous but are also prone to leakage and require maintenance and replacement of expensive pressurized valves. The Electricity Generator System of the present invention is also more efficient in that energy undergoes one translation, linear force to electricity. There are no spinning air motors required.

The Electricity Generator System of the present invention is far less intrusive than the system described in the Background section. Piezoelectric systems have to be embedded in the asphalt in most iterations which makes them very discrete. However, the piezoelectric components have limited life spans and eventually require replacement which means digging them out from cement or pulling them from interred crypt systems. Additionally, the amount of electricity emitted by distorting materials with piezoelectric properties a few millimeters is minute compared to the electrical current induced by a magnetic field travelling a few meters at near explosive velocities when launched by a speeding car. This airbag catapulting system is much less costly, generates more energy and is more easily maintained. There is only one moving part, an airbag with a weighted magnet on one side which can be replaced easily and without destruction of pavement.

Other linear generator comparisons include the submersible linear generators of wave energy converters. The difference here is that the permanent magnet of the wave systems exists within a sealed chamber. It oscillates via tethers to the sea floor and buoys floating above. This results in a magnetic field displacement of under ½ meter for wave displacements that are just over a meter. Essentially the motive force pulls the magnet from the outside. In the closed system pneumatic linear generator, the force travels within an incorporated airbag to move the magnet and the associated magnetic field. The air, airbag and magnet are all physically within the linear generator. In both the wave systems and the system of the present invention the same Faraday principals apply. Stronger magnetic fields; higher velocities; longer distances traveled by the magnetic field; closer proximity to the windings; greater number of windings; and thinner more permeable chambers are associated with more generation of electricity. Additionally, both systems will have varying velocities and distances traveled by the magnetic fields. However, the wave systems require safeguards to prevent damage to the linear generators in rough seas where the force could pull and damage the generators, potential energy is lost. The system of the present invention can handle high velocities without fear of damage to the system. Its resilience and durability result from many factors. First, the distance the magnet can travel is not limited to the length of the airbag, and it is a closed system so the volume of air displaced is the same with each compression. Second, the speed at which it is displaced will determine the height the magnet can travel, and in extreme scenarios the magnet may separate from the top of the airbag. In this instance it simply continues to rise like the carnival Strongman attraction with the massive hammer strike that sends the weight flying to ring the bell. Coils extend all the way to the top of the casing. More energy is converted with 2.5 m to 4.5 m magnetic field distance. The bag is sufficiently strong and sufficiently long to contain the rapid compression on one side by a speeding car. Recall that airbags are made of the same weave technology that protects passengers in MVA accidents under similar physical stressors. Perhaps even stronger weaves may be needed like the weave used in the massive log-like airbags used to safely dry launch new hundred thousand ton ocean liners as giant rollers.

Other linear generators like those within shake flashlights operate with small magnetic field displacement scenarios and produce less energy. Still other systems exist as free pistons in combustion engines to ultimately charge batteries to power electric and hybrid vehicles. Those systems all share the same basic design. A magnet within a sealed tube propelled by an external force be it pulling, pushing, shaking or combustion. The system design of the present invention actually has the airbag, the motive force, within the linear generator. Its inception is divergent for both the unique use of the airbag and the design of the linear generator.

While the energy production is tremendous there are system energy losses primarily through friction. As the bag within the casing expands and the magnet rises, the surface of the bag and the magnet interact with the casing itself. This friction has minimal impact on the upward movement of the magnet. The downward movement will be slowed more dramatically as the velocity is entirely dependent on gravitational pull. To mitigate this effect, external cords encircle the airbag at intervals to tuck the bag and guide efficient deflation, folding and stacking of the material as the weighted magnet descends. The dimensions of the magnet itself, length twice the diameter, and the shape, football like, also reduce the friction. Fine mist silicone lubricant coatings on all surfaces will help as well.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An electrical generator system, comprising:
an environment interface including an interface bladder, and configured to receive a kinetic force from an environmental element to compress the interface bladder to output air from within the interface bladder; and
at least one generator module, configured to receive the outputted air from the interface bladder and including:
a coil;
a magnet; and
a generator bladder configured to receive air and expand to move the magnet through the coil to induce a current in the coil, wherein the coil and the magnet are placed above the generator bladder, after the magnet passes through the coil it is then pulled vertical downward by a gravity to pass through the coil to induce another current in the coil and deflate the generator bladder.

2. The electrical generator system of claim 1, wherein the generator module further includes at least one cord configured to encircle the bladder at intervals to facilitate a rate of deflation of the generator bladder by the magnet pulled downward by the gravity.

3. The electrical generator system of claim 1, further comprising:
at least one battery; and
a rectifier configured to full-wave rectify the induced currents in the coil to charge the battery.

4. The electrical generator system of claim 1, wherein the interface bladder and the generator bladder collectively contain substantially constant amount of air.

5. The electrical generator system of claim 1, further comprising a conduit coupled with both the environment interface and the generator bladder, the conduit transfers air between the environment interface and the generator bladder; wherein the interface bladder, the conduit, and the generator bladder collectively contain substantially constant amount of air.

6. The electrical generator system of claim 5, wherein the generator module includes a plurality of generator modules each having the coil, the magnet, and the generator bladder; the conduit is connected to the generator bladders and distributes the outputted air from the environment interface substantially equally amongst the generator bladders.

7. The electrical generator system of claim 1, wherein the environment interface is substantially longitudinal and configured to be selectively placed below or above a structure surface, a moving object moving over the environment interface decompresses the interface bladder and push air out of the interface bladder toward the generator bladder.

8. The electrical generator system of claim 1, wherein the environment interface further includes a case configured to house the interface bladder, the environment interface is placed in a sea and configured to interact with wave peaks of the sea; wherein the wave peaks compress the interface bladder to output air to the generator bladder to expand and move the magnet.

9. The electrical generator system of claim 8, wherein the generator module is placed above the environment interface and the generator bladder is located between the magnet and the interface bladder, wherein water troughs of the sea allow the magnet to be pulled downward by a gravity to push air out of the generator bladder and toward the interface bladder.

10. The electrical generator system of claim 8, wherein the case includes a plurality of apertures for water of the sea to pass through.

11. The electrical generator system of claim 8, further comprising a weight coupled with a bottom end of the interface bladder.

12. The electrical generator system of claim 1, wherein the environment interface includes a wind interface configured to be moved by wind to compress the interface bladder to output air to the generator bladder.

13. The electrical generator system of claim 12, wherein the wind interface includes three wind elements configured to be moved by wind, the interface bladder includes three sub-bladders each placed between two adjacent wind elements; wherein wind blowing in one direction preferably moves at least one of the wind elements toward the adjacent wind element to compress the sub-bladder to output air to the generator bladder.

14. A method to generate electricity, comprising:
   providing an environment interface having an interface bladder and at least one generator module having a coil, a magnet, and a generator bladder;
   using the environment interface to receive a kinetic force from an environmental element and compress the interface bladder to output air from within the interface bladder;

using the generator bladder to receive the outputted air from the interface bladder and expand to move the magnet through the coil to induce a current in the coil; and
   placing the coil and the magnet above the generator bladder, wherein after the magnet passes through the coil it is then pulled vertical downward by a gravity to pass through the coil to induce another current in the coil and deflate the bladder.

15. The method of claim 14, further comprising:
   connecting one end of a conduit to the interface bladder to receive the outputted air; and
   connecting another end of the conduit to the generator bladder to transfer air between the interface bladder and the generator bladder;
   wherein the outputted air from the interface bladder passes through the conduit to reach and expand the generator bladder.

16. The method of claim 14, further comprising placing the environment interface below a road, wherein a moving object moving over the environment interface decompresses the interface bladder and push air from within the interface bladder and toward the generator bladder.

17. The method of claim 14, further comprising:
   making an electrical generator by placing the interface bladder in a case, placing the generator bladder above the interface bladder, and placing the magnet and the coil above the generator bladder; and
   placing the electrical generator in a sea and keep the interface bladder, the magnet and the coil substantially above a water level; wherein
   one or more wave peaks compress the interface bladder to output air to the generator bladder.

18. The method of claim 14, further comprising:
   providing the environment interface that includes three wind elements configured to be moved by wind; and
   placing one interface bladder between two adjacent wind elements; wherein
   wind blowing in one direction preferably moves at least one of the wind elements toward the adjacent wind element and compress a sub-bladder to output air from within the interface bladder and toward the generator bladder.

19. An electrical generator system, comprising:
   an environment interface including an interface bladder, and configured to receive a kinetic force from an environmental element to compress the interface bladder to output air from within the interface bladder; and
   at least one generator module, configured to receive the outputted air from the interface bladder and including:
   a coil;
   a magnet; and
   a generator bladder configured to receive air and expand to move the magnet through the coil to induce a current in the coil, wherein the environment interface comprises a wind interface configured to be moved by wind to compress the interface bladder to output air to the generator bladder.

* * * * *